United States Patent
Alcalay et al.

(10) Patent No.: US 6,988,206 B1
(45) Date of Patent: Jan. 17, 2006

(54) PREVENTION OF CD-AUDIO PIRACY USING SUB-CODE CHANNELS

(75) Inventors: Ran Alcalay, Tel Aviv (IL); Philippe Selve, Tel Aviv (IL); Patrice Sinquin, Tel Aviv (IL)

(73) Assignee: Macrovision Europe Limited, Maidenhead (GB)

( * ) Notice: Subject to any disclaimer, the term of this patent is extended or adjusted under 35 U.S.C. 154(b) by 0 days.

(21) Appl. No.: 09/549,820

(22) Filed: Apr. 14, 2000

Related U.S. Application Data (63) Continuation-in-part of application No. 09/370,813, filed on Aug. 9, 1999, now Pat. No. 6,425,098, which is a continuation-in-part of application No. 09/175,255, filed on Oct. 20, 1998, now Pat. No. 6,256,738.

(51) Int. Cl.
G06F 12/14 (2006.01)
G11B 7/24 (2006.01)
G11B 15/52 (2006.01)

(52) U.S. Cl. .................. 713/200; 705/57; 369/53.21; 369/275.5; 713/193

(58) Field of Classification Search ............... 713/176, 713/189, 193, 194, 200; 380/236, 237, 200–200.1; 369/47.1, 47.12, 47.13, 84, 275.1, 275.3, 369/275.5, 23.21, 70, 55.21, 93, 34.85; 705/57, 705/58; 360/15, 60, 55; 710/74
See application file for complete search history.

(56) References Cited

U.S. PATENT DOCUMENTS

| | | | | |
|---|---|---|---|---|
| 4,995,026 A | * | 2/1991 | Makabe et al. | 369/70 |
| 5,337,295 A | * | 8/1994 | Maeda | 369/30.27 |
| 5,537,387 A | * | 7/1996 | Ando et al. | 369/275.1 |
| 5,648,954 A | * | 7/1997 | Satoh | 369/53.17 |
| 5,675,694 A | * | 10/1997 | Nakajima et al. | 386/86 |
| 5,699,434 A | * | 12/1997 | Hogan | 380/49 |
| 5,778,257 A | * | 7/1998 | Tsukatani et al. | 710/74 |
| 5,787,068 A | * | 7/1998 | Arps et al. | 369/275.3 |

(Continued)

FOREIGN PATENT DOCUMENTS

| | | |
|---|---|---|
| EP | 0 843 471 | 5/1998 |
| EP | 1 061 514 | 12/2000 |
| EP | 0 899 733 | 3/2001 |
| GB | 2 205 667 | 12/1998 |
| WO | WO 98/08180 | * 2/1998 |
| WO | WO 98/52194 | 11/1998 |
| WO | WO 98/54713 | 12/1998 |
| WO | WO 00/21085 | 4/2000 |
| WO | WO 00/68945 | 11/2000 |
| WO | WO 00/74053 | 12/2000 |
| WO | WO 01/61696 | 8/2001 |
| WO | WO 01/80546 | 10/2001 |

OTHER PUBLICATIONS

Voelcker, et al., "How disks are 'padlocked'" IEEE Spectrum, Jun. 1986, pp. 32–40.*

(Continued)

*Primary Examiner*—Christopher Revak
(74) *Attorney, Agent, or Firm*—James H. Salter; George B. Almeida (57) ABSTRACT

A method for protecting data recorded on an original storage medium against unauthorized copying. The data are encoded in accordance with Standard 908 of the International Electrotechnical Commission. A portion of the encoded data is altered to introduce an error in a sub-code Q channel of the data, such that the altered data are inconsistent with Standard 908, but do not prevent playback of the data following recording thereof. The data, including the altered data, are recorded on the original storage medium, whereby an application which plays back the recorded data runs in a manner substantially unaffected by the alteration of the data, but a substantially unrecoverable error occurs in unauthorized copying of the original storage medium.

33 Claims, 4 Drawing Sheets

U.S. PATENT DOCUMENTS

| | | | | |
|---|---|---|---|---|
| 5,872,750 A | * | 2/1999 | Satoh | 369/30.22 |
| 5,920,540 A | * | 7/1999 | Satoh | 369/275.1 |
| 5,930,209 A | | 7/1999 | Spitzenberger et al. | 369/30.05 |
| 5,956,408 A | | 9/1999 | Arnold | |
| 6,005,839 A | | 12/1999 | Sako et al. | |
| 6,021,101 A | * | 2/2000 | Satoh | 369/30.1 |
| 6,038,209 A | * | 3/2000 | Satoh | 369/275.3 |
| 6,047,292 A | * | 4/2000 | Kelly et al. | 345/716 |
| 6,058,091 A | * | 5/2000 | Yokota et al. | 369/93 |
| 6,104,679 A | * | 8/2000 | Sollish | 369/53.21 |
| 6,253,258 B1 | | 6/2001 | Cohen | |

OTHER PUBLICATIONS

Data interchange on read–only 120 mm optical data disk (CD–ROM), second edition, Standard ECMA, XX, XX, no. ECMA–130, Jun. 1996, 53 pages.

EP Search Report for EP 04 01 6923 dated Sep. 29, 2004, 2 pages.

EP Search Report for EP 04 01 6924 dated Sep. 28, 2004, 2 pages.

EP Search Report for EP 04 01 6925 dated Oct. 19, 2004, 2 pages.

EP Search Report for EP 04 01 6926 dated Sep. 30, 2004, 2 pages.

* cited by examiner

PREVENTION OF CD-AUDIO PIRACY USING SUB-CODE CHANNELS

CROSS-REFERENCE TO RELATED APPLICATIONS

This application is a continuation-in-part of U.S. patent application No. 09/370,813, filed Aug. 9, 1999, now U.S. Pat. No. 6,425,098, entitled "Prevention of Disk Piracy," which is assigned to the assignee of the present patent application and is incorporated herein by reference and which is a continuation-in-part of U.S. patent application Ser. No. 09/175,255 filed Oct. 20, 1998 now U.S. Pat. No. 6,256,738 and is incorporated herein by reference.

FIELD OF THE INVENTION

The present invention relates generally to protection of intellectual property rights, and specifically to prevention of unauthorized copying of recorded audio, computer-readable media using the sub-code Q channel.

BACKGROUND OF THE INVENTION

Compact disk (CD) recordings are a preferred means for distributing both digital audio recordings and computer software. CD audio recordings are almost universally made in accordance with standard 908 of the International Electrotechnical Commission (IEC), entitled, "Compact Disc Digital Audio System" (Geneva, Switzerland, 1987), which is incorporated herein by reference. The 908 standard defines how audio data are to be encoded and recorded on the disk, enabling the data to be played back using standard digital decoding chips. Different standards apply to other types of data, such as computer software, which may be recorded on CD, as well.

Original music CDs are produced by stamping plastic blanks with a master mold piece, which is produced using Costly, specialized equipment. Alternatively, a recordable CD (CDR) may be created by authorized plants according to customer request. Because of the high cost of CD recording equipment, CD recordings were considered, until recently, to be relatively secure against unauthorized copying. This situation has changed recently, as inexpensive CD recording devices and read/write media have become available to consumers. Thus, it is now easy, using a conventional. personal computer with a read/write CD drive, or with one read drive and one write drive, to make exact, digital copies of all types of CDs. The CD content is read out by the computer, byte by byte, from one CD, typically a legitimately-purchased original CD, and then written to a blank CD so as to make a pirate copy. Similar copying methods may be used with other media, such as Digital Video Disks (DVD). Financial losses to the recording and software industries due to such pirate copying are estimated to be in the billions of dollars.

SUMMARY OF THE INVENTION

It is an object of some aspects of the present invention to provide improved methods and apparatus for preventing unauthorized copying of recorded, computer-readable media.

It is a further object of some aspects of the present invention to provide methods and apparatus for producing compact disks that are resistant to unauthorized copying.

It is still a further object of some aspects of the present invention to provide methods and apparatus for preventing unauthorized digital copying of audio disks.

In preferred embodiments of the present invention, signals recorded on an original storage medium are protected against unauthorized copying by changes made in a sub-code channel, preferably the Q-channel. For this purpose, a data-writing unit comprises an encoding block, which receives audio signals and encodes the signals in accordance with standard 908 of the International Electrotechnical Commission (IEC). An error-insertion block of the data-writing unit alters the encoded signals, by introducing an error in a sub-code Q channel of the encoded signals. A recording block of the data-writing unit subsequently records the altered signals on the storage medium, which typically comprises a compact disk (CD).

Preferably, the altered signals are erroneous according to standard 908, but nevertheless do not prevent playback of the signals from the original medium following recording. Thus, the original CD is able to perform in a manner substantially unaffected by the alteration. By contrast, the alteration causes a substantially-unrecoverable error in an unauthorized copy of the CD. Preferably, authorized software residing in the data-writing unit or in other hardware is enabled to duplicate the CD, such that authorized copies also can be played back, unaffected by the alteration.

In some preferred embodiments of the present invention, the error-insertion block inserts the error in the sub-code Q channel by specifying an erroneous absolute track time of the audio signals recorded on the CD. CD copying algorithms known in the art rely on non-corrupted absolute track times, and are therefore unable to make unauthorized copies of CDs which are prepared using these embodiments of the present invention. Optionally, the original absolute track time is stored on the original CD in reserved bits of the sub-code channels that are defined by standard 908. Authorized copying software retrieves the original absolute track time from the reserved bits, and is thereby enabled to make fully-functioning copies of the original CD.

Alternatively, the error is introduced by adding a second session on the disk, with an erroneous lead-in that point to tracks in the program area of the first session and includes special modes to block an unauthorized computer from reading the session.

Further alternatively, the error-insertion. block inserts the error in the sub-code Q channel by specifying an erroneous index number of a track of the audio signals recorded on the CD. CD copying algorithms known in the art rely on the non-corrupted index number of the track, and are therefore unable to make unauthorized copies of CDs which are prepared using these embodiments of the present invention. Optionally, the original index number of a track is stored on the original CD in reserved bits of the sub-code channels that are defined by standard 908. Authorized copying software retrieves the original index number of the track from the reserved bits or from a second session on the disk, and is thereby enabled to make fully-functioning copies of the original CD.

Preferably, in order to allow an authorized personal computer (PC) to play the contents of the protected disk, the original contents are compressed (using any suitable format known in the art, such as MP3 or VQF) and encrypted. These encrypted data are stored in a manner that is hidden to conventional CD driver software, for example in reserved sub-code channel bits, in the pause area or lead-but area, or in a second session on the CD. The data can be decrypted and played back only by using authorized software, which is preferably stored in the second session.

There is therefore provided, in accordance with a preferred embodiment of the present invention, a method for protecting data recorded on an original storage medium against unauthorized copying, including:

receiving data encoded in accordance with Standard 908 of the International Electrotechnical Commission;

altering a portion of the encoded data to introduce an error in a sub-code Q channel of the data, such that the altered data are inconsistent with Standard 908, but do not prevent playback of the data following recording thereof; and recording the data, including the altered data, on the original storage medium, whereby an application which plays back the recorded data runs in a manner substantially unaffected by the alteration of the data, but a substantially unrecoverable error occurs in unauthorized copying of the original storage medium.

Preferably, the medium includes a compact disk, and the data include digital audio data.

In a preferred embodiment, altering the data includes specifying an erroneous absolute time in the data to be recorded on the medium. Preferably, a correct absolute time is stored in reserved sub-code bits on the medium. Most preferably, specifying the erroneous absolute time includes shifting absolute times recorded in three consecutive blocks of a selected track.

In another preferred embodiment, altering the data includes duplicating one or more blocks of the data to a new location on the storage medium, without changing the absolute time recorded in the sub-code Q channel of the one or more blocks.

In still another preferred embodiment, altering the data includes specifying an erroneous point index number in a track of the data to be recorded on the medium. Preferably, the method includes storing a correct index number in reserved sub-code bits on the medium.

In yet another preferred embodiment, altering the data includes generating a multi-session recording, including audio and data sessions, wherein the error in the sub-code Q channel is introduced in one or both of the data and audio sessions. Preferably, generating the multi-session recording includes creating a second lead-in to the data session that points to one or more tracks located in the first session. Alternatively or additionally, generating the multi-session recording includes creating a lead-in to the data session that includes a larger number of tracks than is permitted by the standard. Further alternatively or additionally, generating the multi-session recording includes creating a lead-in to the data session that indicates that the recording medium is shorter than it is in actuality. Still further alternatively or additionally, generating the multi-session recording includes inserting an incorrect absolute time at a start of the data session. Yet further alternatively or additionally, generating the multi-session recording includes creating multiple sessions at least two of which are identified as audio sessions.

In a preferred embodiment, recording the data includes compressing and storing the data in a second session on the medium, for use in making an authorized copy of the medium.

There is also provided, in accordance with a preferred embodiment of the present invention, apparatus for protecting data recorded on an original data storage medium against unauthorized copying, including:

an encoder, adapted to receive a stream of data for recording on the medium and encodes the data in accordance with Standard 908 of the International Electrotechnical Commission;

a sub-code generator, operative to alter a portion of the encoded data by introducing an error in a sub-code Q channel of the data, such that the altered data are. inconsistent with Standard 908, but do not prevent playback of the data following recording thereof; and an eight-to-fourteen bit (EFM) modulator, coupled to modulate the altered data for recording on the original storage medium, whereby an application which plays back the recorded data runs in a manner substantially unaffected by the alteration of the data, but a substantially unrecoverable error occurs in unauthorized copying of the original storage medium.

In a preferred embodiment, the apparatus includes a data session generator, operative to provide a data session to the EFM for recording on the original storage medium, so that the data recorded on the medium include multi-session data, and the error in the sub-code Q channel is introduced in the data session.

There is additionally provided, in accordance with a preferred embodiment of the present invention, a data storage medium that is resistant to unauthorized copying, on which medium data encoded in accordance with Standard 908 of the International Electrotechnical Commission are stored, a portion of which encoded data is altered by introducing an error in a sub-code Q channel of the data, such that the altered data are identified as erroneous according to Standard 908, but do not prevent playback of the data following recording thereof, whereby an application which plays back the recorded data runs in a manner substantially unaffected by the alteration of the data, but a substantially unrecoverable error occurs in unauthorized copying of the original storage medium.

The present invention will be more fully understood from the following detailed description of the preferred embodiments thereof, taken together with the drawings in which:

DETAILED DESCRIPTION OF PREFERRED EMBODIMENTS

Figure 1:
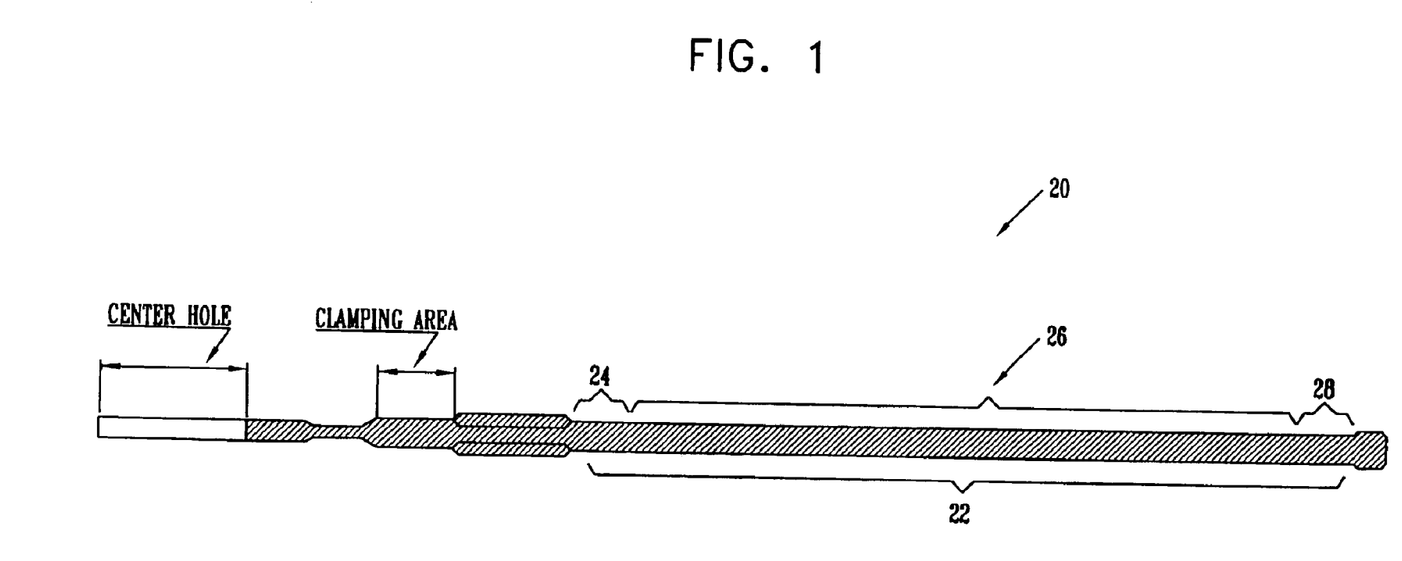
FIG. 1 is a schematic, sectional view of a compact disk (CD), in accordance with recording practice known in the art.

Reference is now made to FIG. 1, which is a schematic sectional view of an audio compact disk (CD) 20, showing the overall layout of the disk, in accordance with recording practice known in the art. An information area 22 includes a lead-in (LI) area 24, a program area (PA) 26 and a lead-out (LO) area 28. Information area 22 progresses outwards in a widening spiral, and contains all of the recorded contents of CD 20. Lead-in area 24 and lead-out area 28 both contain P and Q channels, which include timing and track information used during playback of the CD. Program area 26 consists of up to 99 tracks of audio information (e.g., music), as well as accompanying sub-code information.

Figure 2:
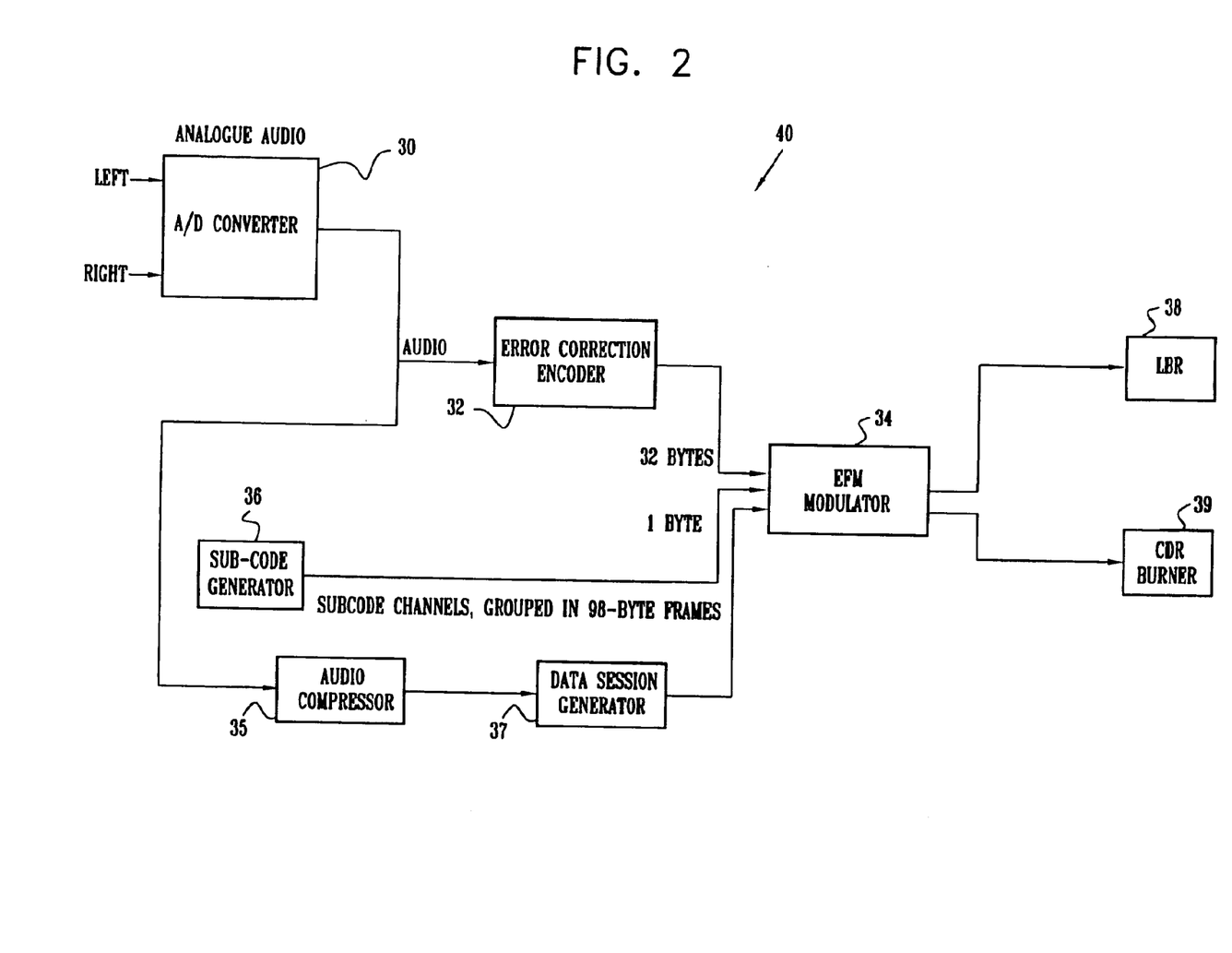
FIG. 2 is a schematic block diagram that illustrates apparatus for producing a copy-resistant CD, in accordance with a preferred embodiment of the present invention.

FIG. 2 is a schematic block diagram that illustrates apparatus 40 for producing a copy-resistant CD, in accordance with a preferred embodiment of the present invention. The original sound, or analog audio, is converted to digital format suitable for encoding on a disk, such that the information can subsequently be played back (decoded) by a standard player of audio CD 20. In a first stage of encoding, a digital bit stream is generated which represents the continuous analog sound signal. The analog signal is converted into discrete digital samples by an analog-to-digital (A/D) converter 30.

To enable detection and correction of errors during playback, parity bits are added to the bit stream. An error-correction encoder 32 employs the commonly used Cross-Interleaved Reed-Solomon Code (CIRC) to reorder the digital data. A sub-code generator 36 adds a byte of sub-code for every thirty-two bytes of error-corrected audio. The 908 standard prescribes the contents of the sub-code channels to be added at this stage. Sub-code generator 36, however, alters the standard sub-codes in such a manner that ordinary playback of the CD is substantially unaffected, but unauthorized copying is prevented. In particular, the alterations do not compromise the integrity of the bit stream and do not generate CIRC errors on the disk. Methods of such alteration are described hereinbelow.

Apparatus 40 is also shown to include an optional data session generator 37, for use in producing multi-session disks that include both audio and data sessions. As described hereinbelow, the data session is configured so as to prevent an unauthorized computer from reading the CD. An audio compressor 35 is optionally provided to compress the audio input for inclusion in such a multi-session disk in an encoded form. It is known in the art to map a standard eight-bit byte of sound data into a fourteen-bit "optical" byte, and to include in the recording additional information, such as playback control and display functions. An eight-to-fourteen modulator (EFM) 34 combines the output of error-correction encoder 32 with the output of sub-code generator 36 and data session generator 37. Each bit of encoded data is preferably physically inscribed onto a master for producing CD 20, using a laser beam recorder (LBR) 38 to create a series of microscopic pits on the master. Alternatively, a dedicated burner 39 is used to produce CD 20 directly on a recordable CD (CDR).

Figure 3:
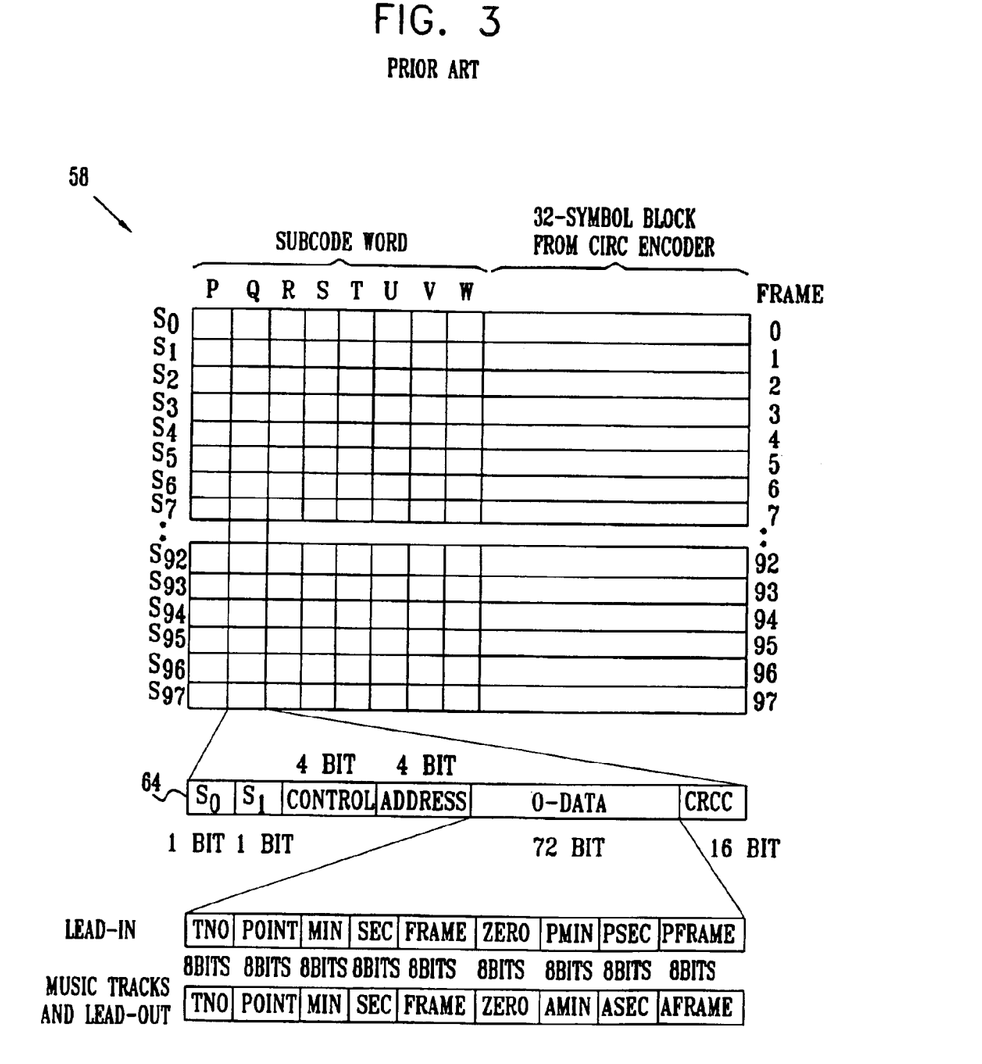
FIG. 3 is a schematic illustration of details of a data structure written to a CD, in accordance with recording practice known in the art.

FIG. 3 is a schematic illustration of details of the data structure received by EFM modulator 34, in accordance with the 908 standard. A block 58 of data for recording on a CD contains 98 frames, each frame made up of 32 bytes of data, or symbols, received from encoder 32 (or from the data session generator 37) and one eight-bit "sub-code" word. The eight bits in each sub-code word are respectively called P, Q, R, S, T, U, V, and W.

The Q bits from 98 consecutive frames are collectively called a sub-code Q channel 64. The sub-code Q channel contains program and timing information, including synchronization bits S0 and S1, 4 control bits, 4 address bits, 72 data bits, and a 16-bit cyclic redundancy check code (CRCC). In lead-in area 24, the 72 data bits include relative time (R-Time, or track time) data 74 and track position, while in program area 26, relative time and absolute time (A-Time, or disk time) data are stored. The relative time for each block indicates the length of. time from the beginning of a current track to the beginning of the block. The absolute time indicates the length of time from the beginning of program area 26 to the beginning of the block. Time is measured in units of minutes, seconds and frames (different from the 98 data frames in a block), with 75 time frames in a second. The Q channel also includes a track number (TNO) and in-track indices, also referred to as point indices. In lead-in area 24, the Q channel carries table of contents (TOC).

Table I below schematically illustrates alteration of absolute time values of sub-code Q channel 64, in accordance with a preferred embodiment of the present invention. In typical encoding of CD 20 according to standard 908, absolute time starts at the beginning of program area 26 and increases linearly to the end of lead-out area 28. Copying software known in the art uses the absolute time as a pointer, in order to ensure smooth reproduction of the original audio and synchronicity of timing between recorded frames and played-back frames. Preferably embodied, an error is deliberately introduced the absolute time values of the sub-code Q channel, own in the "altered" column in the table, thereby increasing the speed at which time appears to pass in track.

TABLE I

| Original time | | | Altered time | | |
|---|---|---|---|---|---|
| Min | Sec | Frame | Min | Sec | Frame |
| 0 (start track) | 0 | 0 | 0 | 0 | 0 |
| 0 | 0 | 1 | 0 | 0 | 2 |
| 0 | 0 | 2 | 0 | 0 | 4 |
| 0 | 0 | 3 | 0 | 0 | 6 |
| 0 | 0 | 4 | 0 | 0 | 7 |
| 0 | 0 | 5 | 0 | 0 | 8 |
| ... | ... | ... | ... | ... | ... |
| 0 | 0 | 71 | 0 | 0 | 74 |
| 0 | 0 | 72 | 0 | 1 | 0 |
| ... | ... | ... | ... | ... | ... |
| 5 (end track) | 30 | 42 | 5 | 36 | 20 |
| 5 (pause) | 30 | 43 | 5 | 30 | 43 |
| 5 | 30 | 44 | 5 | 30 | 44 |
| ... | ... | ... | ... | ... | ... |

So as not to adversely affect stereo play-back of the audio, the absolute time for original CD 20 is preferably increased in three consecutive blocks out of every 150 consecutive blocks, and returned to normal in a pause area between tracks, as shown in the table above. A standard CD player will be unaffected by these intentional distortions of the absolute time. An unauthorized copy of CD 20, however, will contain discontinuities in the music, for example, where absolute time jumps from frame 2 to frame 4 to frame 6, in the table above. The resulting signal on the CD copy will have a series of constant-amplitude, audible, distorted and generally unmelodious sounds.

Optionally, the original, correct absolute time information is stored in the reserved bits of the sub-code R–W channels (FIG. 3), which are currently unassigned according to standard 908. Authorized software is enabled to make copies of original CD 20 by accessing the data stored in the R–W channels.

Alternatively, rather than introducing errors in the absolute time, errors that produce audible effects in unauthorized copies are introduced in sub-code Q channel 64 by changing point index values. Like the absolute track time, the point index provides a series of "checkpoints" within a track. An erroneous series of point indices will cause mute areas in an unauthorized copy of CD 20, but will not affect the playback of the original CD. Optionally, as described above, the correct indices are stored in the R–W channels, and authorized software is enabled to copy the original CD by retrieving the indices from these channels.

Figure 4:
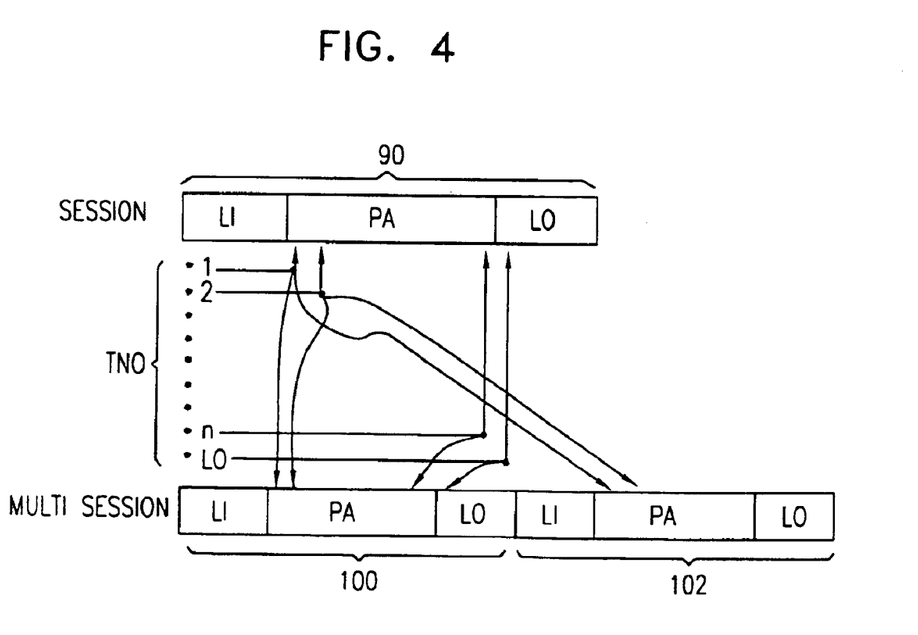
FIG. 4 is a block diagram that schematically illustrates duplication of data on a CD for the purpose of preventing unauthorized copying, in accordance with a preferred embodiment of the present invention.

FIG. 4 is a block diagram that schematically illustrates another method for preventing unauthorized copying of a CD, using data session generator 37, in accordance with a preferred embodiment of the present invention. Whereas an audio CD has only a single session 90, multi-session CDs can have multiple sessions, including, for example, an audio session 100 and a data session 102. Audio CD players read only the first session on a multi-session CD, in this case session 100 and ignore the rest. When the CD is inserted into a CD-ROM drive, however, the computer can access any of the sessions and therefore will be confused by the errors embedded as part of the second or subsequent sessions. The present embodiment therefore operates by introducing faulty data into the sub-code Q channel of data session 102. Preferably, faulty data are introduced into session 100, as well. In consequence, the audio CD player will reproduce the audio signals on the disk without difficulty. The computer, however, will be confused by either the data session or the faulty data in audio session 100 (or by both) and will not be able to play the disk, let alone copy it.

Errors in data session 102 are preferably introduced by one or more of the following mechanisms:

Generating a data session with a lead-in that points to tracks located in the program area of the first session.

Generating a data session lead-in with a larger number of tracks than is allowed by the 908 standard.

Modifying the data session lead-in to simulate a shorter CD.

Modifying the absolute time at the beginning of the data session. Alternatively, an additional audio session is generated, so that there are at least two audio sessions out of a total of three or more sessions on the disk.

Preferably, in order to allow an authorized personal computer (PC) to play the contents of the protected disk, the original contents are compressed (using any suitable format known in the art, such as MP3 or VQF) and encrypted, by audio compressor 35 (FIG. 2). These encrypted data are stored in a manner that is hidden to conventional CD driver software, for example in the reserved sub-code channel bits, as described above, or in one of the data sessions on the CD, or in a lead-in, lead-out or pause area. The data can be decrypted and played back only by using authorized software, which is also preferably stored in the second session and is made available only to appropriately-licensed users and/or equipment. The authorized software will prevent the decryption of the data if its source is not the original CD.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method for protecting data recorded on an original storage medium against unauthorized use, comprising:
   receiving digital audio data encoded in accordance with Standard 908 of the International Electrotechnical Commission;
   incorporating the digital audio data in a audio session of a multi-session recording, which further comprises a data session;
   introducing an error in a sub-code Q channel of the data session, so as to prevent a computer from reproducing the recording, without preventing playback of the audio data by an audio player; and
   recording the audio and data sessions, including the error in the sub-code Q channel, on the original storage medium.

2. A method according to claim 1, wherein the medium comprises a compact disk.

3. A method according to claim 1, and comprising altering a portion of the encoded audio data to introduce a further error in the audio session, such that the sub-code Q channel of the audio session is inconsistent with Standard 908, but does not prevent playback of the audio data by the audio player following recording thereof.

4. A method according to claim 3, wherein altering the data comprises specifying an erroneous absolute time in the data to be recorded on the medium.

5. A method according to claim 4, and comprising storing a correct absolute time in reserved sub-code bits on the medium.

6. A method according to claim 4, wherein specifying the erroneous absolute time comprises shifting absolute times recorded in three consecutive blocks of a selected track.

7. A method according to claim 3, wherein altering the data comprises duplicating one or more blocks of the data to a new location on the storage medium, without changing an absolute time recorded in the sub-code Q channel of the one or more blocks.

8. A method according to claim 3, wherein altering the data comprises specifying an erroneous point index number in a track of the data to be recorded on the medium.

9. A method according to claim 8, and comprising storing a correct index number in reserved sub-code bits on the medium.

10. A method according to claim 1, wherein introducing the error comprises creating a lead-in to the data session that points to one or more tracks located in the audio session.

11. A method according to claim 1, wherein introducing the error comprises creating a lead-in to the data session that includes a larger number of tracks than is permitted by the standard.

12. A method according to claim 1, wherein introducing the error comprises inserting a modified absolute time at a start of the data session.

13. A method according to claim 1, wherein incorporating the digital audio data comprises creating multiple sessions at least two of which are identified as audio sessions.

14. A method according to claim 1, wherein recording the audio and data sessions comprises compressing and encrypting the audio data on the medium, for use by an authorized computer in playback of the medium.

15. Apparatus for protecting data recorded on an original data storage medium against unauthorized use, comprising:
   an encoder, adapted to receive a stream of digital audio data for recording on the medium and to encode the digital audio data in accordance with Standard 908 of the International Electrotechnical Commission;
   a data session generator, which is adapted to incorporate the digital audio data in an audio session of a multi-session recording, which further comprises a data session;
   a sub-code generator, operative to introduce an error in a sub-code Q channel of the data session, so as to prevent a computer from reproducing the recording, without preventing playback of the audio data by an audio player; and
   an eight-to-fourteen bit (EFM) modulator, coupled to modulate the audio and data sessions, including the error in the sub-code Q channel, for recording on the original storage medium.

16. Apparatus according to claim 15, wherein the medium comprises a compact disk.

17. Apparatus according to claim 15, wherein the sub-code generator is adapted to introduce a further error in the sub-code Q channel of the audio session, such that the sub-code Q channel of the audio session is inconsistent with Standard 908, but does not prevent playback of the audio data by the audio player following recording thereof.

18. Apparatus according to claim 17, wherein the further error in the sub-code Q channel comprises an erroneous value of the absolute time of a track of the data to be recorded on the medium.

19. Apparatus according to claim 17, wherein the further error in the sub-code Q channel is engendered by duplicating one or more blocks of the data to a new location on the storage medium, without changing an absolute time recorded in the Q channel of the one or more blocks.

20. Apparatus according to claim 17, wherein the further error in the sub-code Q channel comprises an erroneous value of a point index number of a track of the data to be recorded on the medium.

21. Apparatus according to claim 15, wherein the error comprises a lead-in to the data session that points to one or more tracks located in the audio session.

22. Apparatus according to claim 15, wherein the error comprises a lead-in to the data session that includes a larger number of tracks than is permitted by the standard.

23. Apparatus according to claim 15, wherein the error comprises a modified absolute time at a start of the data session.

24. Apparatus according to claim 15, wherein the multi-session recording comprises at least two audio sessions.

25. Apparatus according to claim 15, and comprising an audio compressor, which is adapted to compress and encrpyt the audio data on the medium, for use by an authorized computer in playback of the medium.

26. A data storage medium that is resistant to unauthorized copying, on which medium data encoded in accordance with Standard 908 of the International Electrotechnical Commission are stored in an audio session of a multi-session recording, which further comprises a data session, wherein an error is introduced in a sub-code Q channel of the data session, so as to prevent a computer from reproducing the recording, without preventing playback of the audio data on the medium by an audio player.

27. A medium according to claim 26, wherein the medium comprises a compact disk.

28. A medium according to claim 26, wherein the a further error is introduced in the sub-code Q channel of the audio session, such that the sub-code Q channel of the audio session is inconsistent with Standard 908, but does not prevent playback of the audio data by the audio player following recording thereof.

29. A medium according to claim 26, wherein the error comprises a lead-in to the data session that points to one or more tracks located in the audio session.

30. A medium according to claim 26, wherein the error comprises a lead-in to the data session that includes a larger number of tracks than is permitted by the standard.

31. A medium according to claim 26, wherein the error comprise a modified absolute time at a start of the data session.

32. A medium according to claim 26, wherein the milti-session recording comprises at least two audio session.

33. A medium according to claim 26, wherein the audio data are further stored on the medium in a compressed and encrypted form, for use by an authorized computer in playback of the medium.

* * * * *